C. DAY & G. E. WINDELER.
CENTRIFUGAL GOVERNOR.
APPLICATION FILED JAN 2, 1914.
Reissued Feb. 3, 1914. 13,682.
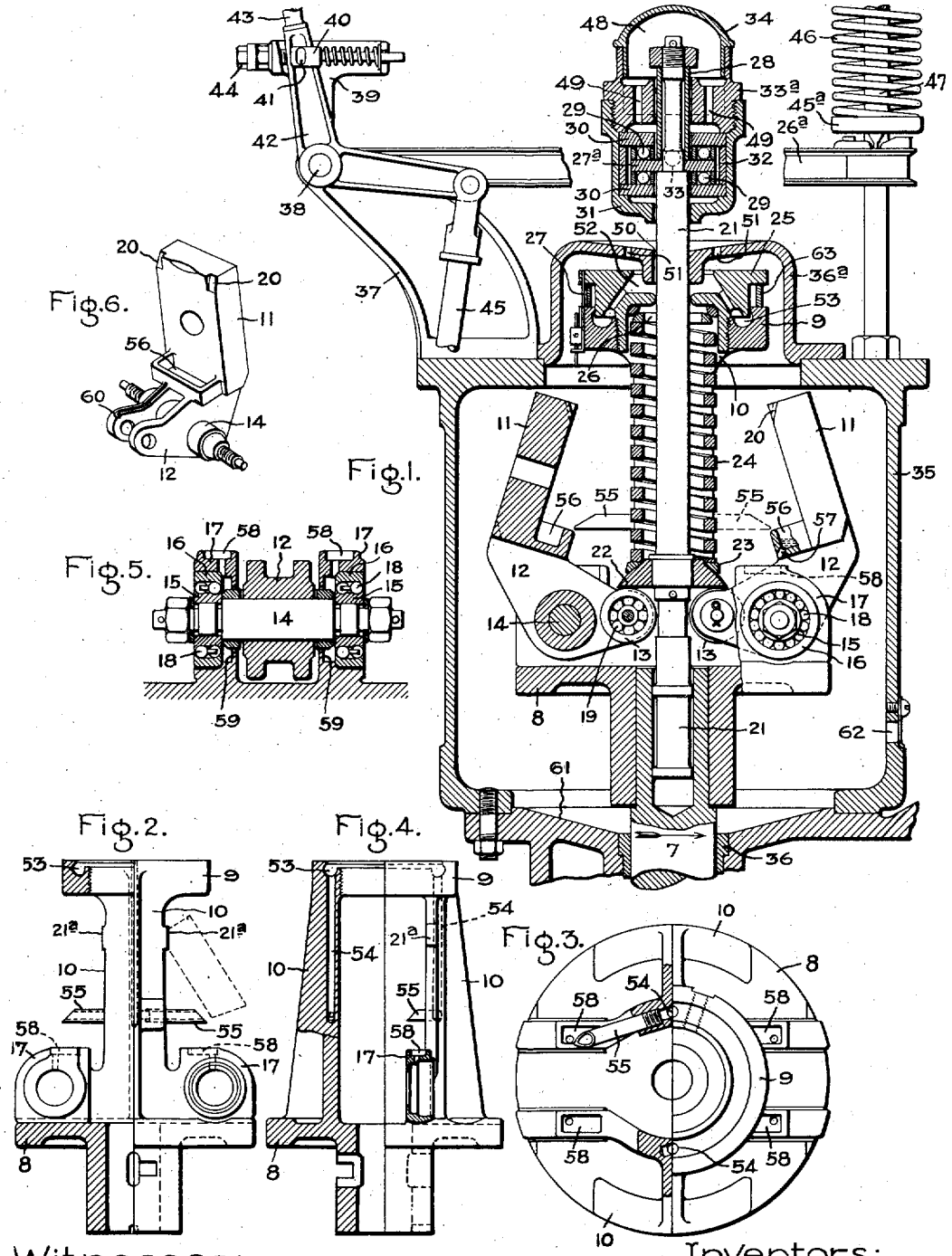
Witnesses:
Margaret A. Dillhauly
Helen Osgood
Inventors:
Charles Day, George E. Windeler,
by: Albert G. Davis
Their Attorney.

UNITED STATES PATENT OFFICE.

CHARLES DAY AND GEORGE EDWARD WINDELER, OF STOCKPORT, ENGLAND, ASSIGNORS TO GENERAL ELECTRIC COMPANY, A CORPORATION OF NEW YORK.

CENTRIFUGAL GOVERNOR.

13,682. Specification of Reissued Letters Patent. Reissued Feb. 3, 1914.

Original No. 1,071,988, dated September 2, 1913, Serial No. 703,389. Application for reissue filed January 2, 1914. Serial No. 810,095.

*To all whom it may concern:*

Be it known that we, CHARLES DAY and GEORGE E. WINDELER, subjects of the King of Great Britain, and residing at Stockport, county of Cheshire, England, have invented certain new and useful Improvements in Centrifugal Governors, of which the following is a specification.

Our invention relates to centrifugal governors and has for its object to improve their construction, particular reference being made to the means for reducing friction and for lubricating the parts whereby the action of the governor is improved and its life increased.

Other improved features of advantage will be more fully described hereinafter.

In the accompanying drawing which illustrates one of the embodiments of our invention, Figure 1, is vertical section of a governor; Fig. 2 is a detail view of the frame which carries the weights and spring, said view being partly in elevation and partly in section; Fig. 3 is plan view of the frame partly in section; Fig. 4 is view of the frame partly in section and taken at right angles to the view in Fig. 2; Fig. 5 is a detail view showing the ball-bearing supported pivot of one of the weights, and Fig. 6 is a perspective of one of the weights.

Our improved governor while adapted more especially for high compression internal combustion engines is also capable of general application.

Referring to the drawing, 7 indicates the driving shaft which may be the main shaft of the engine or a secondary shaft driven through suitable gearing therefrom. Mounted on the shaft, and rotating with it, is a frame comprising a lower head 8 that is keyed or otherwise secured to the driving shaft and an upper head 9. These heads are connected by two upright columns or members 10. On the lower head are mounted two weights of the construction best shown in Fig. 6. As both weights are similar, a description of one of them will be sufficient.

11 indicates the weight which is made in the form of a rectangular block. On the lower end is an arm 12 which is forked to receive the roller 13. Extending through the arm and making a snug fit therein is a pivot 14. On each end of the pivot is a ball bearing of suitable construction, said bearing comprising in the present instance an inner ring 15 fitted snugly on the pivot and an outer ring 16 fitted snugly into a boss 17 formed on the lower head. The balls 18 are confined in place between the rings. The axes of the pivots are located in the same horizontal plane and are parallel to each other and are equidistant from the axis of the governor as a whole. To insure satisfactory operation lost motion between the parts is eliminated as far as possible. Each of the rollers 13 is supported by a ball bearing 19 of a construction similar to that previously described but smaller in diameter. The pivots for these rollers extend through the arm 12 and are prevented from moving endwise by cotter pins or other means. The weights are beveled slightly at their outer ends as indicated at 20, said beveled parts forming stops that engage projections 21[a] on the column 10, as shown in Fig. 2, and limit the inward movements of the weights. The weights are also provided with oil chambers and oil feeding grooves as will appear later.

The upper end of the shaft 7 is provided with a socket and located therein and making a sliding fit is a spindle 21. Mounted on the spindle and engaging a shoulder thereon is a collar 22, which forms the movable abutment of the governor. The rollers 13 engage the under side of this abutment and transmit the movements of the weights to it and to the spindle. The upper surface of the abutment is rounded and mounted thereon is a washer 23 which forms the lower seat for the spring 24 that opposes the outward movements of the weights. The object in rounding the upper surface of the abutment and the under surface of the washer is to insure a uniform pressure of the spring on the abutment and prevent any tendency of said spring to force the spindle to one side and create undue friction.

The upper head 9 of the frame is provided with a central screw threaded orifice, and located therein is an adjustable nut 25 that forms the fixed abutment of the governor. This nut has a recess in its under side to receive the upper end of the spring and also spherical surfaced washers 26 that form a self-adjusting seat for said spring and prevent binding of the parts. The nut is also provided with a plurality of peripheral notches to receive the thin plate 27 that acts as a lock to prevent the nut from turning after it has once been adjusted. By changing the position of the nut the tension on the spring can be changed and hence the speed of the engine. When it is desired to adjust the governor for widely different speed conditions, a spring of different character may be readily substituted without changing the other parts. The nut is also provided with an oil chamber and grooves, as will appear later.

On the upper end of the spindle is mounted a thrust collar by means of which the axial movements of the spindle are transmitted to the governor lever 26[a]. The end of the spindle is reduced in section to form a shoulder and mounted thereon is a hardened steel disk 27[a]. The disk is held in place by a tubular spacer 28, which, in turn, is held by a nut on the end of the spindle. Above and below the disk are ball bearings 29 of suitable construction. Above and below the ball bearings are hardened steel thrust plates 30 which are fitted snugly into the casing 31 and separated by the proper distance by the tubular spacer 32. The casing 31 is provided with two pins 33, one being shown in dotted lines, arranged one on each side, which engage the lever 26[a] and transmit axial movements of the spindle to it. The spindle 21, disk 27[a], and ball bearings 29 are somewhat smaller in diameter than the bored openings in the casing 31, to permit the latter to move slightly with respect to the spindle as the lever 26[a] moves on its fulcrum. The upper end of the casing is provided with a nut 33[a] which, when screwed into place, clamps the hardened thrust plates 30 in position. It is also provided with an oil reservoir and cover 34 therefor.

The governor is inclosed by a casing 35 which is fixed on some suitable part of the engine frame that carries the bearing 36 of the shaft 7. Mounted on top of the casing is a cover or cap 36[a] having a central orifice to receive and guide the spindle 21. The top surface of the cap is beveled toward said orifice so that oil will flow toward the spindle as will appear later. Mounted on top of the casing is a bracket 37 which carries the fulcrum 38 for the governor lever. This lever is provided with an upwardly extending arm 39, and mounted thereon is a spring pressed head 40 which has a pin 41 that enters a hole in the bell-crank lever 42, the latter being sleeved on the fulcrum 38 and provided with a handle 43. The arm also carries an adjusting screw 44 that forms a back-stop for the lever 42. The other end of the lever 42 is connected to a tubular rod 45 which is arranged to control the action of one or more valves of the pump which supplies fuel to the internal combustion engine. As an example, the rod 45 may control the suction valves of the fuel pump. Under some conditions notably in starting the engine, it is sometimes desirable to supply the pulverizer of the engine with a different—usually, a greater amount of oil than for normal operation. The arrangement of the bell-crank lever 42 and the arm 39 permit of this. The operator by manipulating the handle 43 can control the fuel pump or pumps to the exclusion of the speed governor, thereby varying the supply of fuel at will. Just as soon as the operator releases the handle, it returns to the position shown and the governor resumes its normal function.

Acting on the right hand end of the governor lever is a means whereby the governor can be loaded or unloaded to change the speed while the engine is running. It comprises a head 45[a], having a knife edge on its under side that rests on the lever 26[a]. Above the head is a coiled compression spring 46 whose tension can be adjusted by a nut threaded on the rod 47.

It is of the greatest importance to fully lubricate the parts in order that the governor may regulate the speed of the engine within narrow limits at all times. This is out of the question if the parts moving on one another get dry and wear. Even a very slight lost-motion in one member due to wear or imperfect workmanship will seriously affect the regulation. To this end a small amount of lubricating oil is poured into the chamber 48 as required. Generally it will be found best to put a wick in this chamber and stick its ends into the holes 49, so that the oil will be moved by capillary attraction. From this point the oil flows through the vertical holes 49 on to the thrust plate 30 and through its central opening to the ball bearings. After lubricating the thrust bearing the oil collects in the bottom of the casing 31 and flows through the shaft clearance and down the shaft to the slightly coned top of the cap 36[a]. Opening into the bore of the cap are as many oil carrying passages 50 as are necessary. We have found three to be satisfactory. Other holes 51 are also provided to take care of any excess oil. The oil passing through the holes 50 in the stationary cap falls into the chamber 52 in the rotating nut 25. From the chamber it is thrown by centrifugal force through the downwardly extending passages into the annular chamber 53 in the head 9, Fig. 1. It is to be noted that the lower end of the nut projects below the upper surface of the head, and that the parts are so shaped that oil will be discharged into the chamber rather than outside. The oil flows from the annular chamber 53 down the vertically disposed passages 54 in the columns 10, Fig. 4.

At the ends of the passages are horizontally disposed pieces of tubing 55 that form spouts to convey oil to the receiving chambers 56 in the weights. This transfer of oil is due chiefly to centrifugal force. In this connection it must be noted that only a very small amount of oil passes through the governor, hence the importance of having some means for actually forcing or throwing oil from the vertical columns to the moving weight. Furthermore, the tubes 55 have to be relatively short so as not to interfere with the in-and-out movements of the weights. It will be seen from Fig. 1 that unless some force was relied on to force the oil it would fall between the end of the spout and the wall of chamber 56. By using a chamber of sufficient length it can be arranged, as shown, to feed oil to both the ball bearings of the weights carrying pivot. By extending one of the spouts 55 in one direction and the other in the opposite direction, both weights will receive oil in substantially equal quantities because the cross-sectional areas of the passage, etc., are the same as are also their lengths. Each chamber 56 discharges oil by the orifices 57, Fig. 1 into the recesses 58 formed in the lugs 17, from which it flows through small holes to the ball bearings, suitable guards 59, Fig. 5, being provided to direct the oil. Oil also flows from the chamber 56 in the weight through the groove 60, Fig. 6, to the ball bearing of the roller 13. It will thus be seen that each and every part requiring oil will receive the necessary amount, and further, that the operator only has to supply oil to one place, *i. e.*, the chamber 48, the remaining parts receiving it automatically. Furthermore, since the casing 31 containing the chamber 48 does not rotate, oil can be poured into it at any time without interference from moving parts. After the oil has passed through the various bearings, it is collected in the bottom of the case and conveyed by the inclined wall 61 to the shaft bearing 36. In the side of the governor casing 35 is an opening 62, through which oil can be poured into the casing to supply the bearing 36, the said opening also permits of inspection. It is provided with a cover of suitable construction.

It is sometimes necessary or desirable to partly disassemble the governor, and under these conditions there is a chance that the tension of the spring 24 will be changed, particularly if the workman is not skilled. To avoid this the following arrangement is provided: The nut 25 is adjusted in test until the governor operates at the proper speed. The distance between the flange of the nut and the upper surface of the head is then carefully measured, and a tubular spacer 63 made to fill it. The nut is then removed and the spacer inserted and the nut screwed down until it rests thereon. This always insures the same tension for the spring and hence the same operating conditions.

By using ball bearings in the manner indicated, we have been able to reduce the friction of the moving parts to a negligible amount, and have also been able to do away with lost motion which is a matter of the greatest importance where close regulation is required. By supporting the spindles 14 at both ends all tendency for the weights to rock sidewise is avoided. In so far as the oiling system is concerned, it is evident that it can be applied to governors using other forms of bearings, and other forms of devices for transmitting motion from the governor weights to the movable abutment.

In accordance with the provisions of the patent statutes, we have set forth what we believe to represent the best embodiment of our invention, but it is to be understood that the drawing is only illustrative of our invention, and that it can be carried out by other means.

What we claim as new and desire to secure by Letters Patent of the United States, is:—

1. In combination, a speed governor having a spindle and a lever actuated thereby with means for transmitting motion from the spindle to the lever comprising a disk mounted on the spindle, ball bearings located above and below the disk, a tubular spacer for holding the disk on the spindle, thrust plates located above and below the ball bearings, a casing containing the plates, a spacer between the plates, a nut for holding the plates, and a means for uniting the casing and the lever.

2. In a speed governor, the combination of movable weights, an opposing spring, a support therefor, a governor lever which is moved by the weights and spring, a second lever, a spring means for connecting the two levers, and a fulcrum that is common to both levers.

3. In a speed governor, the combination of movable weights, an opposing spring, a support therefor, a shaft for rotating the support, a governor lever which is moved by the weights and spring, a second lever, a fulcrum that is common to both levers, a spring means that unites the levers and normally causes them to move in unison, and means for moving one lever independently of the other.

4. In a speed governor, the combination of movable weights, an opposing spring, a means for supporting and driving the same, a governor lever which is provided with an arm, a second lever normally moved by the first, a block that is connected to the second lever, a spring interposed between the arm and block, and means for compressing the spring and moving the second lever independently of the first.

5. In a speed governor, the combination of movable weights and an opposing spring, a driving support therefor, a governor lever which is moved by the weights and spring, an auxiliary spring acting on the lever for changing the effective action of the weights on said lever, a second lever that normally moves in unison with the first, a means connecting the two levers, and means for moving one lever independently of the other.

6. In a speed governor the combination of a rotary support having an oil chamber, pivotally supported weights driven by the support, means opposing the outer movements of the weights, bearings for the pivots carried by the support, and means receiving oil from the chamber and acting by centrifugal force to deliver it to said bearings.

7. In a speed governor, the combination of pivotally supported weights each having an oil chamber, bearings for the pivots that receive oil from the chambers, a means that supports and drives the weights, means carried by the supporting means which act by centrifugal force to discharge oil into the chambers, and means for opposing the forces exerted by the weights.

8. In a speed governor, the combination of pivotally supported weights, a movable abutment, means opposing the movements of the abutment, pivotally supported rollers for transmitting movements of the weights to the abutment, a support for the weights and means that contains an oil chamber, and means receiving oil from the chamber and acting by centrifugal force to supply it to the pivots of the weights and rollers.

9. In a speed governor, the combination of pivotally supported weights each of which is provided with an oil chamber, a spring that opposes the action of the weights, a driven frame that carries the weights and spring and has an oil chamber, and spouts that project from the frame, receive oil from the chamber and discharge it into the chambers in the weights for lubricating the pivots.

10. In a speed governor, the combination of pivotally supported weights, an opposing means therefor, a driving frame therefor that contains an oil chamber, a spindle that is moved by the joint action of the weights and means, a governor lever, means that permits the spindle to rotate within it for transmitting axial movements of the spindle to the lever, and which contains an oil chamber, passages conveying oil from the last named chamber to the first, and means receiving oil from the chamber in the frame and conveying it to the pivots of the weight.

11. In a speed governor, the combination of pivotally supported weights, an opposing spring, a driving and supporting frame for the weights that contains an oil chamber, a chambered adjusting nut for the spring which is carried by the frame and delivers oil to the chamber therein, a non-rotatable member which supplies oil to the chamber in the nut, downwardly extending oil passages in the frame that communicate with the chamber therein, and spouts that receive oil from the passages and act by centrifugal force to convey it to the pivots.

12. In a speed governor, the combination of pivotally supported weights, each having an oil chamber on its inner surface that supplies oil to its pivot, an opposing spring, a supporting and driving frame for the weights that contains an oil chamber, and oppositely extending spouts that receive oil from the chamber in the frame and convey it to the chambers in the weights.

13. In a speed governor, the combination of centrifugally acting weights, an opposing spring, a frame that carries the weights and spring, an adjusting nut for the spring, and a spacing device which is interposed between the nut and frame to determine the proper position of the nut.

In witness whereof, we have hereunto set our hands this 18th day of December 1913.

CHARLES DAY. [L. S.]
GEORGE EDWARD WINDELER. [L. S.]

Witnesses:
ERNOLD SIMPSON MOSELEY.
MALCOLM SMETHURST.